L. V. ANNABLE.
VEHICLE WHEEL WITH DEMOUNTABLE RIM.
APPLICATION FILED APR. 7, 1916.

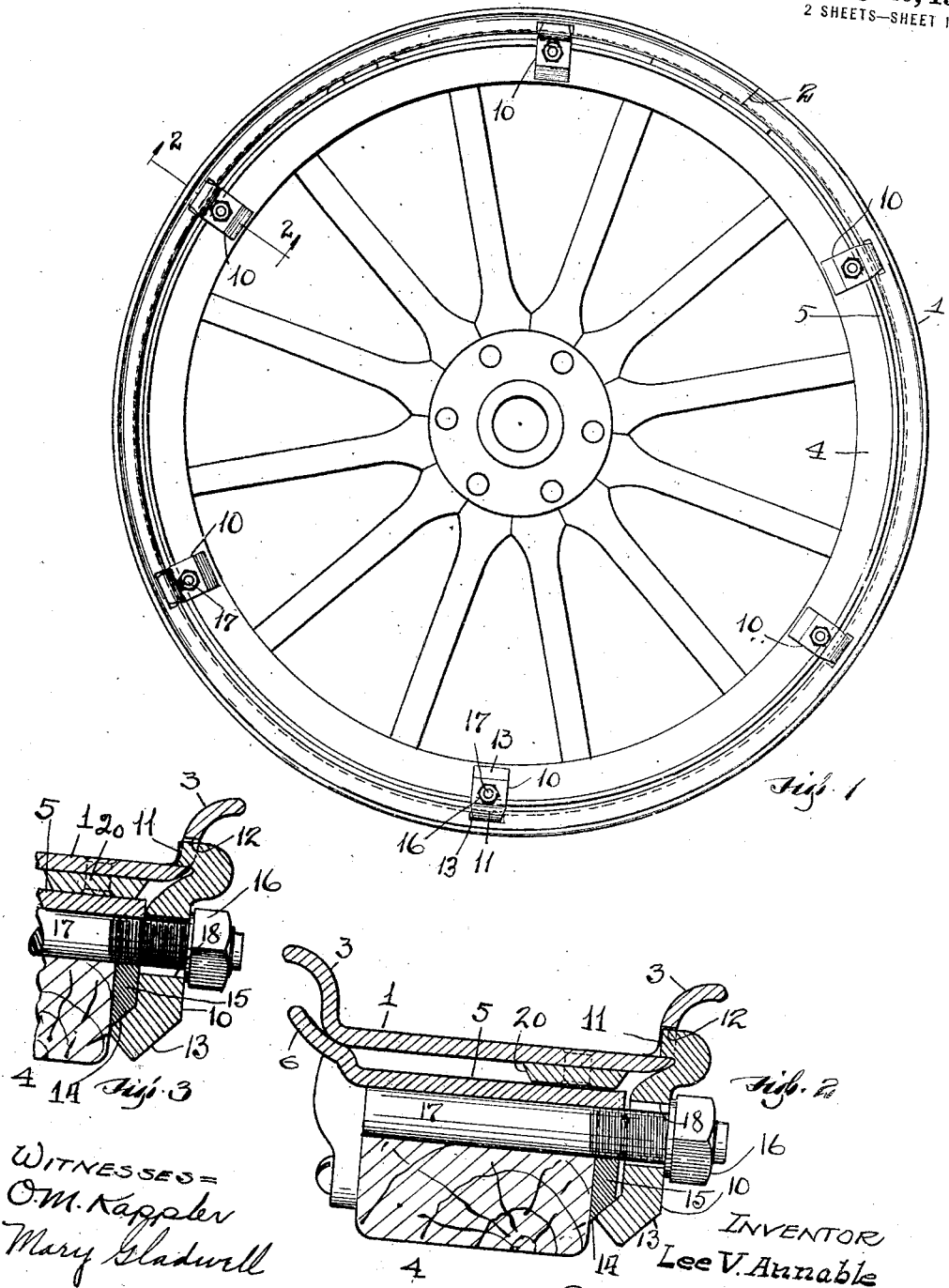

1,348,975.

Patented Aug. 10, 1920.
2 SHEETS—SHEET 2.

WITNESSES
O. M. Kappler
Mary Gladwell

INVENTOR
Lee V. Annable
BY Fay, Oberlin & Fay
ATTORNEYS

UNITED STATES PATENT OFFICE.

LEE V. ANNABLE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL WITH DEMOUNTABLE RIM.

1,348,975.

Specification of Letters Patent. Patented Aug. 10, 1920.

Application filed April 7, 1916. Serial No. 89,624.

*To all whom it may concern:*

Be it known that I, LEE V. ANNABLE, a citizen of the United States, and a resident of Cleveland, county of Cuyahoga, and State of Ohio, have invented a new and useful Improvement in Vehicle-Wheels with Demountable Rims, of which the following is a specification, the principle of the invention being herein explained and the best mode in which I have contemplated applying that principle, so as to distinguish it from other inventions.

The object of the present invention is to provide simple and effective means for securing, or locking, a so-called demountable rim onto the wheel body, by tying the same thereto rather than wedging it on, as has heretofore been the general practice. Rather, I propose a combination wedging and tying action, the one side or edge of the demountable rim being directly fitted onto a beveled or inclined seat on the adjacent side of the felly-band or wheel body, while the other side of such rim is secured to the wheel body by means that pull radially inwardly on the same at circumferentially spaced points. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 4:
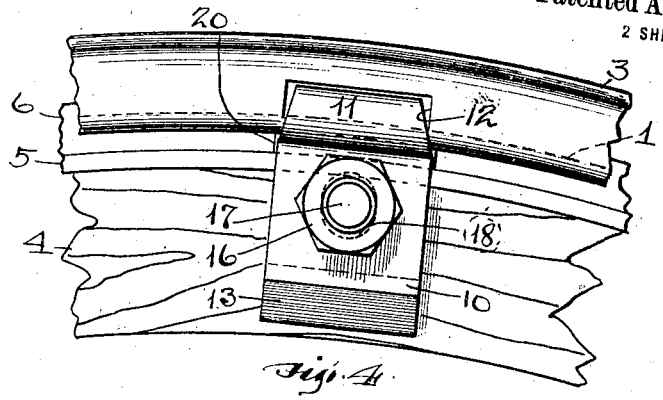
Figure 5:
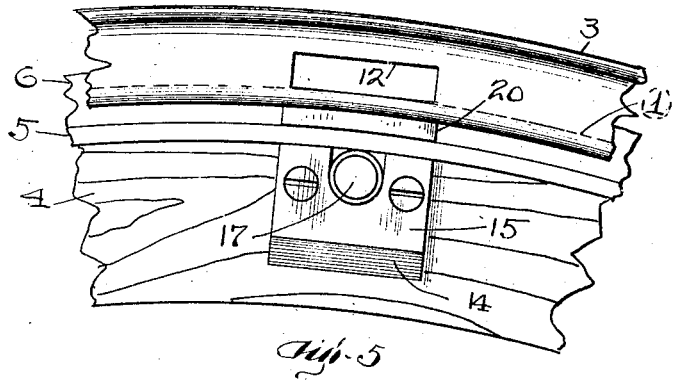
Figure 6:
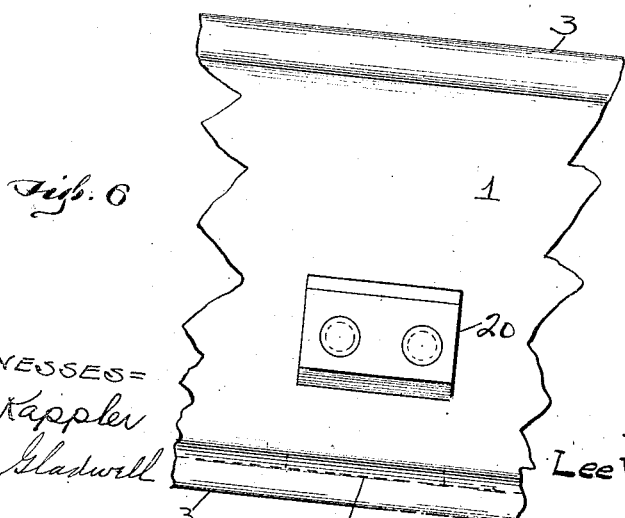

Figure 1 is an elevation of a wheel and rim, complete, with my improved locking means in place; Fig. 2 is a transverse section thereof taken on the plane indicated by the line 2—2, Fig. 1, the locking means being shown in a position approaching the final operative position; Fig. 3 is a broken sectional view similar to Fig. 2, but showing such locking means in final operative position; Fig. 4 is a side elevation, on a larger scale than in Fig. 1, of a portion of the wheel body and rim, showing one of the devices constituting the locking means in place; Fig. 5 is a view similar to Fig. 4, but with a portion of such locking device removed, showing the coöperative elements of the rim and wheel-body; and Fig. 6 is a bottom plan view of the portion of the rim appearing in Figs. 4 and 5.

The form of demountable rim 1 illustrated is similar to that currently in use, known as the "Continental" rim, and may be either a continuous rim, or transplit as shown at 2 in Fig. 1, or it may be made of sectional construction, as will be readily understood, such modifications in construction having nothing to do with the present invention. As illustrated, moreover, said rim is shown with side flanges 3 adapting it to receive and support a straight-sided tire, but obviously these flanges may be clencher flanges for use with the corresponding type of tire, if desired. The wheel body, likewise, is in the main of familiar construction, including a felly 4 surrounded by a felly-band 5, the rear edge of which is bent radially outward so as to form an inclined flange 6, with which the rear edge of the rim 1, when in seated position on the wheel, is designed to engage.

In such Continental rim construction as heretofore utilized, a plurality of wedges are introduced in circumferentially spaced relation between the outer edge of the rim and the corresponding edge of the fellyband, in order to securely lock the rim in place, the effect being to place the rim under tension as it were, by reason of the outward component of the force exerted by the several wedges. In the present construction, however, instead of such wedge elements, I provide a series of clamps 10, the action of which, as previously indicated, is to draw or pull radially inwardly upon the rim at circumferentially spaced points around its front side, or outer edge.

While these clamps 10 may take on various forms, and the coöperating portions of the rim and wheel body may be variously fashioned, I prefer to make said clamps of the form illustrated best in Figs. 2 and 3. As there shown they consist of plates having an upper recurved hook-like end 11, adapted to detachably engage in recesses 12 formed in the outer side of the rim, more exactly in the side flange thereof just above the level of the outer surface of the rim. The lower end 13 of each of said clamps is bent inwardly at an obtuse angle to the body of the clamp, and engages a correspondingly beveled edge 14 on a plate 15 fixedly attached to the front face of the felly, and so constituting in effect an integral part of the wheel body. Movement of the clamps 10 transversely of such wheel body is conveniently effected by means of nuts 16 on the ends of transversely disposed bolts 17 projecting through the side of the felly and the aforesaid fixed plates 15, and through suitable openings 18 in the clamp plates themselves. Such last-named openings 18 are desirably elongated a trifle in a radial direction, so that a certain amount of movement is permitted the clamps in such direction.

Alined with the recesses 12 in the rim, that are designed to be engaged by the respective clamps 10, is a series of supporting plates or lugs 20 on the under side of the rim. These may be either riveted or welded thereto, or may be stamped up integrally from the material of the rim, as will be readily understood. The thickness of such supporting lugs is such that they very nearly, but not quite, equal the radial distance between the outer face of the felly band and the inner face of the rim, in the latter's normal condition.

With the clamps 10 out of the way, accordingly, such rim may be readily slipped onto the felly-band, or removed therefrom. When thus slipped on, the inner side or edge of the rim seats upon the inclined flange 6, that extends around the corresponding edge of the felly band, thereby securing a continuous circumferential support for such rim-side. Upon applying the clamps 10 to the several bolts, they will initially occupy the position shown in Fig. 2, wherein it will be seen that the supporting lugs 20 have a slight clearance or working fit with respect to the rim. However, upon drawing up the nuts on the bolts, so as to force said clamps transversely of the wheel body, they are at the same time caused to move radially inwardly by the engagement of their lower inclined ends, with the beveled edges of the fixed plates 15, as shown in Fig. 3. As a consequence the adjacent portions of the rim are likewise drawn radially inwardly until the supporting lugs are firmly seated, or clamped, against the felly band.

A slight buckling, in an outward radial direction, may be produced in the several arcs of the rim intermediate between successive clamps, but it is inconsequential and does not in any way affect the security of the mounting, the pressure of the load on such intermediate portions being transmitted, as by a truss, to the supporting lugs adjacent the corresponding clamps.

In order to remove the rim, it will be obvious that all that is necessary is to release the clamps and either swing them out of the way (if properly dimensioned), or else remove them entirely from the bolts, whereupon the rim may be taken off in the usual fashion.

It has been found that the foregoing securing means for locking the rim in place on the wheel body are particularly desirable for use with rims of the trans-split type as illustrated, relieving, as such means do, the strain which is otherwise put upon the lock for holding the rim-ends together, where the rim is placed under tension by the introduction of wedging means between the same and the felly-band, or wheel body, as in the prevailing construction. In other words, according to the present invention, by pulling radially inwardly at circumferentially spaced points about the outer side of the rim, such rim ends are drawn toward each other, rather than forced apart, at least at the front side of the rim. Consequently a maximum tolerance may be left at the split in the rim as manufactured, inasmuch as the space between the rim ends will be decreased, and not increased when the rim is in service. This contracting effect counteracts any tendency to open the split unduly, as the rear side of the rim rides up onto the flange on the corresponding edge of the felly-band. There will thus result a slight difference in the internal diameter of the rim at its front and rear edges, respectively, but this is desirable rather than otherwise, for it has been found that the rim is thus caused to seat all the more firmly on such rear flange of the felly-band.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a wheel body; of a demountable rim therefor; and means for securing said rim onto said wheel body, said means including a member attached to the latter and adapted to detachably engage said rim, an inwardly inclined face on said wheel body, said member having a complementary inclined face, and means adapted to draw said member toward said wheel body, whereby such inclined faces coöperate to move said member radially inward and exert a pull on said rim in the same direction.

2. The combination with a wheel body; of a demountable rim therefor; and means for securing said rim onto said wheel body, said means including a series of members attached to the latter at circumferentially spaced points about the same and adapted to detachably engage said rim, a corresponding series of plates on the side of said wheel body having inwardly inclined faces, said members having complementary inclined faces, and means adapted to draw said members toward said wheel body, whereby such inclined faces coöperate to move said members radially inward and exert a pull on said rim in the same direction.

3. The combination with a wheel having a transversely beveled, outwardly inclined surface adjacent its one edge and an inwardly inclined face on its opposite side; of a demountable rim for said wheel body having its one side formed to seat on such outwardly inclined surface; members attached to said wheel body and adapted to detachably engage the other side of said rim, said members having inclined faces complementary to that on the side of said wheel body; and means adapted to draw said members toward said wheel body, whereby such inclined faces coöperate to move said members radially inward and exert a pull on said rim in the same direction.

4. The combination with a wheel having a transversely beveled, outwardly inclined surface adjacent its one edge and a series of circumferentially spaced plates on its opposite side presenting inwardly inclined faces; of a demountable rim for said wheel body having its one side formed to seat on such outwardly inclined surface; a series of members corresponding with said plates and having complementary inclined faces, said members being adapted to detachably engage the other side of said rim; and means adapted to draw said members toward said wheel body, whereby such inclined faces coöperate to move said members radially inward and exert a pull on said rim in the same direction.

Signed by me this 29 day of March, 1916.

LEE V. ANNABLE.

Attested by—
JOHN C. MANTERNACH,
OTTO H. JOBSKI.